(12) United States Patent
Kurabayashi

(10) Patent No.: US 11,032,666 B2
(45) Date of Patent: Jun. 8, 2021

(54) SYSTEM, MOBILE TERMINAL DEVICE, SERVER, PROGRAM, AND METHOD FOR VISIT CONFIRMATION

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/804,743

(22) Filed: Feb. 28, 2020

(65) Prior Publication Data

US 2020/0204946 A1 Jun. 25, 2020

Related U.S. Application Data

(63) Continuation of application No. PCT/JP2018/031930, filed on Aug. 29, 2018.

(30) Foreign Application Priority Data

Aug. 29, 2017 (JP) .............................. JP2017-163977

(51) Int. Cl.
*H04W 4/021* (2018.01)
*H04W 4/20* (2018.01)
(Continued)

(52) U.S. Cl.
CPC ............ *H04W 4/021* (2013.01); *G06F 21/33* (2013.01); *G06Q 50/10* (2013.01); *H04M 11/00* (2013.01); *H04W 4/20* (2013.01); *H04W 12/104* (2021.01); *H04W 12/122* (2021.01); *H04W 12/63* (2021.01); *H04W 12/72* (2021.01); *H04W 68/02* (2013.01); *H04W 4/80* (2018.02)

(58) Field of Classification Search
CPC ....... H04W 4/021; H04W 4/20; H04W 68/02; H04W 12/104; H04W 12/122; H04W 12/72; H04W 12/63; H04W 4/80; H04M 11/00; G06F 21/33; G06Q 50/10
USPC .................... 455/404.2, 410–411, 456.1–457
See application file for complete search history.

(56) References Cited

U.S. PATENT DOCUMENTS

| | | | | |
|---|---|---|---|---|
| 2011/0311094 A1* | 12/2011 | Herzog | ............... | H04L 63/0428 382/100 |
| 2016/0005077 A1* | 1/2016 | McDevitt | ........... | G06Q 30/0267 705/14.58 |
| 2016/0088434 A1* | 3/2016 | Jayanthi | ............ | H04M 1/72403 455/456.1 |

FOREIGN PATENT DOCUMENTS

| | | |
|---|---|---|
| JP | 2013000552 A | 1/2013 |
| WO | 2017065060 A1 | 4/2017 |

* cited by examiner

*Primary Examiner* — Michael Y Mapa
(74) *Attorney, Agent, or Firm* — Osha Bergman Watanabe & Burton LLP

(57) ABSTRACT

The present invention provides a system used to confirm that a user of a mobile terminal device has visited a prescribed location, the system including the mobile terminal device and a server, the server including a control device and one or more wireless devices, wherein: the one or more wireless devices transmit a service notification; the mobile terminal device transmits a visit confirmation request; at least one wireless device transmits a task notification; the mobile terminal device executes a task on the basis of the task notification and repeatedly transmits a task completion notification; at least one wireless device transmits a solution request; the mobile terminal device transmits a solution notification; at least one wireless device receives the solution notification transmitted from the mobile terminal (Continued)

device; and the control device determines the legitimacy of the visit confirmation request on the basis of the solution notification.

12 Claims, 7 Drawing Sheets

(51) Int. Cl.
    *H04W 68/02*     (2009.01)
    *H04W 12/104*     (2021.01)
    *H04W 12/122*     (2021.01)
    *H04W 12/72*     (2021.01)
    *H04W 12/63*     (2021.01)
    *H04M 11/00*     (2006.01)
    *G06F 21/33*     (2013.01)
    *G06Q 50/10*     (2012.01)
    *H04W 4/80*     (2018.01)

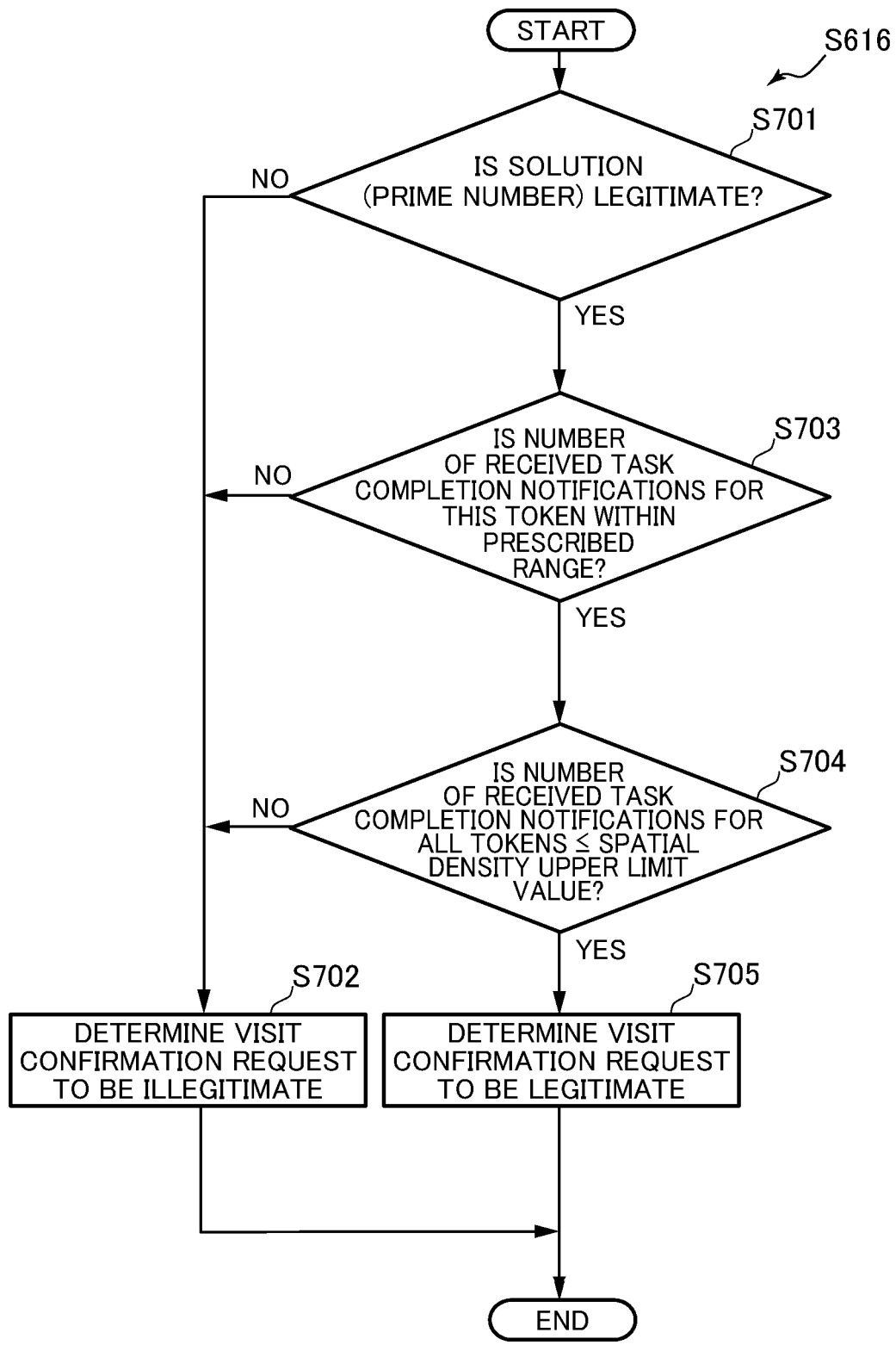

SYSTEM, MOBILE TERMINAL DEVICE, SERVER, PROGRAM, AND METHOD FOR VISIT CONFIRMATION

TECHNICAL FIELD

The present invention relates to a system, a program, a mobile terminal device, a server, and a method for confirming a visit to a prescribed location.

BACKGROUND ART

A service that provides a person who visited a prescribed location, such as a store, with a bonus in the store or an online game is known. Patent Literature 1 describes a system in which points for a net game are provided by executing check-in processing in which GPS is used to identify a position, and the fact that a registered store, etc. has been visited is confirmed.

CITATION LIST

Patent Literature

{PTL 1} Japanese Unexamined Patent Application, Publication No. 2013-000552

SUMMARY OF INVENTION

Technical Problem

When providing a check-in service that provides a user who has visited a prescribed location with a bonus for a store, a game, etc., in the case where a system using GPS to identify the position of the user, etc. is employed, there is a risk that the bonus is illegitimately obtained by a malicious person tampering with position information to pretend to have visited the prescribed location despite the fact that that person has not visited the location.

It is also possible to detect that a user has visited a prescribed location by using NFC (Near Field Radio Communication). A mechanism for forgery prevention or encryption is incorporated in the original design of NFC, and a secure communication session is established between a mobile terminal device provided with NFC and an NFC reader in an ad hoc manner. This makes it possible to easily realize a function for executing a check-in at a prescribed position by merely bringing a mobile terminal close to the NFC reader without additional processing such as pairing. However, because the communicable range of NFC is narrow, i.e., less than or equal to approximately 10 cm, and the directionality of NFC is relatively strong, it is required to hold the mobile terminal over the NFC reader. Thus, it is not possible to execute simultaneous check-ins of a group of a large number of users gathering at a specific area.

As a method for executing simultaneous check-ins of a group of a large number of users, a method using a BLE (Bluetooth (registered trademark) Low Energy) beacon or a two-dimensional code has been conceived. In the method in which a BLE beacon is used, an ultra-compact device called a BLE beacon broadcasts, to peripheral devices, a BLE advertising packet in which a UUID or a URL has been embedded, which makes it possible to cause a mobile terminal device that received the packet to execute an operation according to a current position. However, with this method, it is possible to receive a beacon by using an illegitimate application, and, by executing sniffing in which the beacon is transferred on a network, it is possible for a single device to act as the proxy of a plurality of devices and authenticate the devices on behalf of users present at remote sites.

Furthermore, a two-dimensional code can encode up to 2,953 bytes of binary data on printed matter if the code is a QR code (registered trademark), which is a representative two-dimensional code, and thus, it is possible to configure the two-dimensional code to be an entry point for check-ins by storing a URL, etc. serving as a network identifier in the two-dimensional code. However, because the two-dimensional code is simple printed matter, the two-dimensional code can be easily duplicated by merely capturing an image of the two-dimensional code with a camera and saving the image. Thus, it is not possible to prevent illegitimate distribution of the two-dimensional code on a network.

As described above, a system for providing a check-in service that has tamper resistance for preventing illegitimate acts and that has scalability for simultaneously confirming visits of a large amount of users to a prescribed location has not been realized.

Solution to Problem

The present invention has been made in view of the problem described above and has the following features. That is, a system in an embodiment of the present invention is a system used to confirm that a user of a mobile terminal device has visited a prescribed location, the system including the mobile terminal device and a server, the server including a control device and one or more wireless devices, wherein: the one or more wireless devices transmit a service notification notifying that a visit confirmation service is available; upon receiving the service notification, the mobile terminal device transmits a visit confirmation request including a user identifier identifying the user of the mobile terminal device; at least one wireless device of the one or more wireless devices receives the visit confirmation request and transmits a task notification issuing a notification about a token and a task associated with the user identifier; the mobile terminal device executes the task on the basis of the task notification; upon completing the task, the mobile terminal device repeatedly transmits a task completion notification including the token; upon confirming that the task completion notification has repeatedly been transmitted, at least one wireless device of the one or more wireless devices transmits a solution request requesting a solution that is an output of the task; upon receiving the solution request, the mobile terminal device transmits a solution notification including the solution of the task; at least one wireless device of the one or more wireless devices receives a solution notification transmitted from the mobile terminal device; and the control device determines the legitimacy of the visit confirmation request on the basis of the solution notification.

The determination of the legitimacy of the visit confirmation request may be executed also on the basis of whether or not the number of task completion notifications including the token associated with the user identifier and received by the one or more wireless devices within a prescribed time for determining temporal density legitimacy is within a prescribed range.

The determination of the legitimacy of the visit confirmation request may be executed also on the basis of whether or not the number of task completion notifications received within a prescribed period for determining spatial density legitimacy by a wireless device, among the one or more wireless devices, that received the task completion notification including the token associated with the user identifier exceeds a spatial density upper limit value.

The task may be prime factorization of a composite number associated with the token, and the solution notification may include a prime number obtained by executing the prime factorization of the composite number.

A server in the embodiment of the present invention is a server used to confirm that a user of a mobile terminal device has visited a prescribed location, the server including a control device and one or more wireless devices, wherein: the one or more wireless devices transmit a service notification notifying that a visit confirmation service is available; at least one wireless device of the one or more wireless devices receives a visit confirmation request including a user identifier transmitted from the mobile terminal device and transmits a task notification issuing a notification about a token and a task associated with the user identifier; upon confirming that a task completion notification has repeatedly been transmitted from the mobile terminal device, at least one wireless device of the one or more wireless devices transmits a solution request requesting a solution that is an output of the task; at least one wireless device of the one or more wireless devices receives a solution notification transmitted from the mobile terminal device; and the control device determines the legitimacy of the visit confirmation request on the basis of the solution notification.

A mobile terminal device in the embodiment of the present invention is a mobile terminal device used to confirm that a user of the mobile terminal device has visited a prescribed location, wherein the mobile terminal device: upon receiving a service notification transmitted from one or more wireless devices, transmits a visit confirmation request including a user identifier identifying the user of the mobile terminal device; executes a task on the basis of a task notification received from at least one wireless device of the one or more wireless devices and notifying a token and the task associated with the user identifier; upon completing the task, repeatedly transmits a task completion notification including the token; and when the mobile terminal device receives a solution request from at least one wireless device of the one or more wireless devices, transmits a solution notification including a solution of the task.

Furthermore, a set of programs in the embodiment of the present invention is a set of programs for a system used to confirm that a user of a mobile terminal device has visited a prescribed location, the system including the mobile terminal device and a server, the server including a control device and one or more wireless devices, the set of programs causing the execution of: a step in which the one or more wireless devices transmit a service notification notifying that a visit confirmation service is available; a step in which, upon receiving the service notification, the mobile terminal device transmits a visit confirmation request including a user identifier identifying the user of the mobile terminal device; a step in which at least one wireless device of the one or more wireless devices receives the visit confirmation request and transmits a task notification issuing a notification about a token and a task associated with the user identifier; a step in which the mobile terminal device executes the task on the basis of the task notification; a step in which, upon completing the task, the mobile terminal device repeatedly transmits a task completion notification including the token; a step in which, upon confirming that the task completion notification has repeatedly been transmitted, at least one wireless device of the one or more wireless devices transmits a solution request requesting a solution that is an output of the task; a step in which, upon receiving the solution request, the mobile terminal device transmits a solution notification including the solution of the task; a step in which at least one wireless device of the one or more wireless devices receives the solution notification transmitted from the mobile terminal device; and a step in which the control device determines the legitimacy of the visit confirmation request on the basis of the solution notification.

Furthermore, a program in the embodiment of the present invention is a program used to confirm that a user of a mobile terminal device has visited a prescribed location, the program causing a server including a control device and one or more wireless devices to execute: a step of transmitting a service notification notifying that a visit confirmation service is available; a step of receiving a visit confirmation request including a user identifier transmitted from the mobile terminal device and transmitting a task notification issuing a notification about a token and a task associated with the user identifier; a step in which at least one wireless device of the one or more wireless devices transmits a solution request requesting a solution that is an output of the task; a step in which, upon confirming that a task completion notification has repeatedly been transmitted from the mobile terminal device, at least one wireless device of the one or more wireless devices receives a solution notification transmitted from the mobile terminal device; and a step in which the control device determines the legitimacy of the visit confirmation request on the basis of the solution notification.

A program in the embodiment of the present invention is a program used to confirm that a user of a mobile terminal device has visited a prescribed location, the program causing the mobile terminal device to execute: a step in which, upon receiving a service notification transmitted from one or more wireless devices, a visit confirmation request including a user identifier identifying the user of the mobile terminal device is transmitted; a step in which a task is executed on the basis of a task notification received from at least one wireless device of the one or more wireless devices and notifying a token and the task associated with the user identifier; a step in which, upon completing the task, a task completion notification including the token is repeatedly transmitted; and a step in which, when the mobile terminal device receives a solution request from at least one wireless device of the one or more wireless devices, a solution notification including a solution of the task is transmitted.

A method in the embodiment of the present invention is a method executed by a system used to confirm that a user of a mobile terminal device has visited a prescribed location, the system including the mobile terminal device and a server, the server including a control device and one or more wireless devices, the method including: a step in which the one or more wireless devices transmit a service notification notifying that a visit confirmation service is available; a step in which, upon receiving the service notification, the mobile terminal device transmits a visit confirmation request including a user identifier identifying the user of the mobile terminal device; a step in which at least one wireless device of the one or more wireless devices receives the visit confirmation request and transmits a task notification issuing a notification about a token and a task associated with the user identifier; a step in which the mobile terminal device executes the task on the basis of the task notification; a step in which, upon completing the task, the mobile terminal device repeatedly transmits a task completion notification including the token; a step in which, upon confirming that the task completion notification has repeatedly been transmitted, at least one wireless device of the one or more wireless devices transmits a solution request requesting a solution that is an output of the task; a step in which, upon receiving the solution request, the mobile terminal device transmits a solution notification including the solution of the task; a step in which at least one wireless device of the one or more wireless devices receives the solution notification transmitted from the mobile terminal device; and a step in which the control device determines the legitimacy of the visit confirmation request on the basis of the solution notification.

Furthermore, a method in the embodiment of the present invention is a method used to confirm that a user of a mobile terminal device has visited a prescribed location, the method executed by a server including a control device and one or more wireless devices, the method including: a step of transmitting a service notification notifying that a visit confirmation service is available; a step of receiving a visit confirmation request including a user identifier transmitted from the mobile terminal device and transmitting a task notification issuing a notification about a token and a task associated with the user identifier; a step in which, upon confirming that a task completion notification has repeatedly been transmitted from the mobile terminal device, at least one wireless device of the one or more wireless devices transmits a solution request requesting a solution that is an output of the task; a step in which at least one wireless device of the one or more wireless devices receives a solution notification transmitted from the mobile terminal device; and a step in which the control device determines the legitimacy of the visit confirmation request on the basis of the solution notification.

A method in the embodiment of the present invention is a method used to confirm that a user of a mobile terminal device has visited a prescribed location, the method executed by the mobile terminal device, the method including: a step in which, upon receiving a service notification transmitted from one or more wireless devices included in a server, a visit confirmation request including a user identifier identifying the user of the mobile terminal device is transmitted; a step in which a task is executed on the basis of a task notification received from at least one wireless device of the one or more wireless devices and notifying a token and the task associated with the user identifier; a step in which, upon completing the task, a task completion notification including the token is repeatedly transmitted; and a step in which, when the mobile terminal device receives a solution request from at least one wireless device of the one or more wireless devices, a solution notification including a solution of the task is transmitted.

Advantageous Effects of Invention

According to the present invention, it is possible to realize a visit confirmation system in which an illegitimate authentication by a malicious user is prevented, and visits of a large amount of users to a prescribed location can be confirmed substantially simultaneously.

BRIEF DESCRIPTION OF DRAWINGS

FIG. 7 is a flowchart showing legitimacy determination information processing according to the embodiment of the present invention.

DESCRIPTION OF EMBODIMENT

Figure 1:
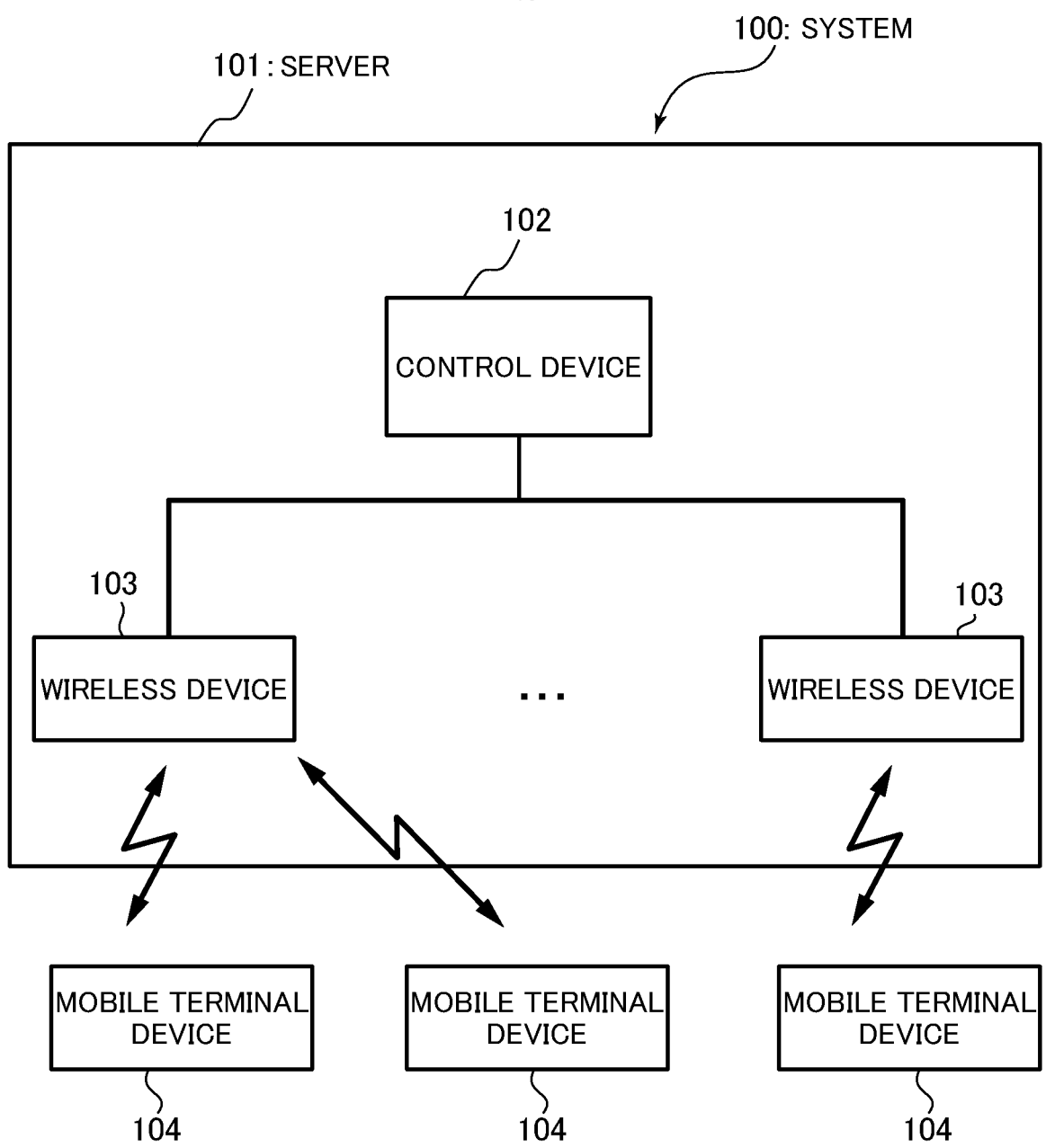
FIG. 1 shows the overall configuration of a system according to an embodiment of the present invention.

An embodiment of the present invention will be described below with reference to the drawings. A visit confirmation system 100 according to this embodiment can be realized by a system including a server 101 and one or more mobile terminal devices 104, as shown in FIG. 1. The server 101 includes a control device 102 and one or more wireless devices 103. The server 101 can execute wireless communication with the mobile terminal devices 104 via the wireless devices 103.

Figure 2:
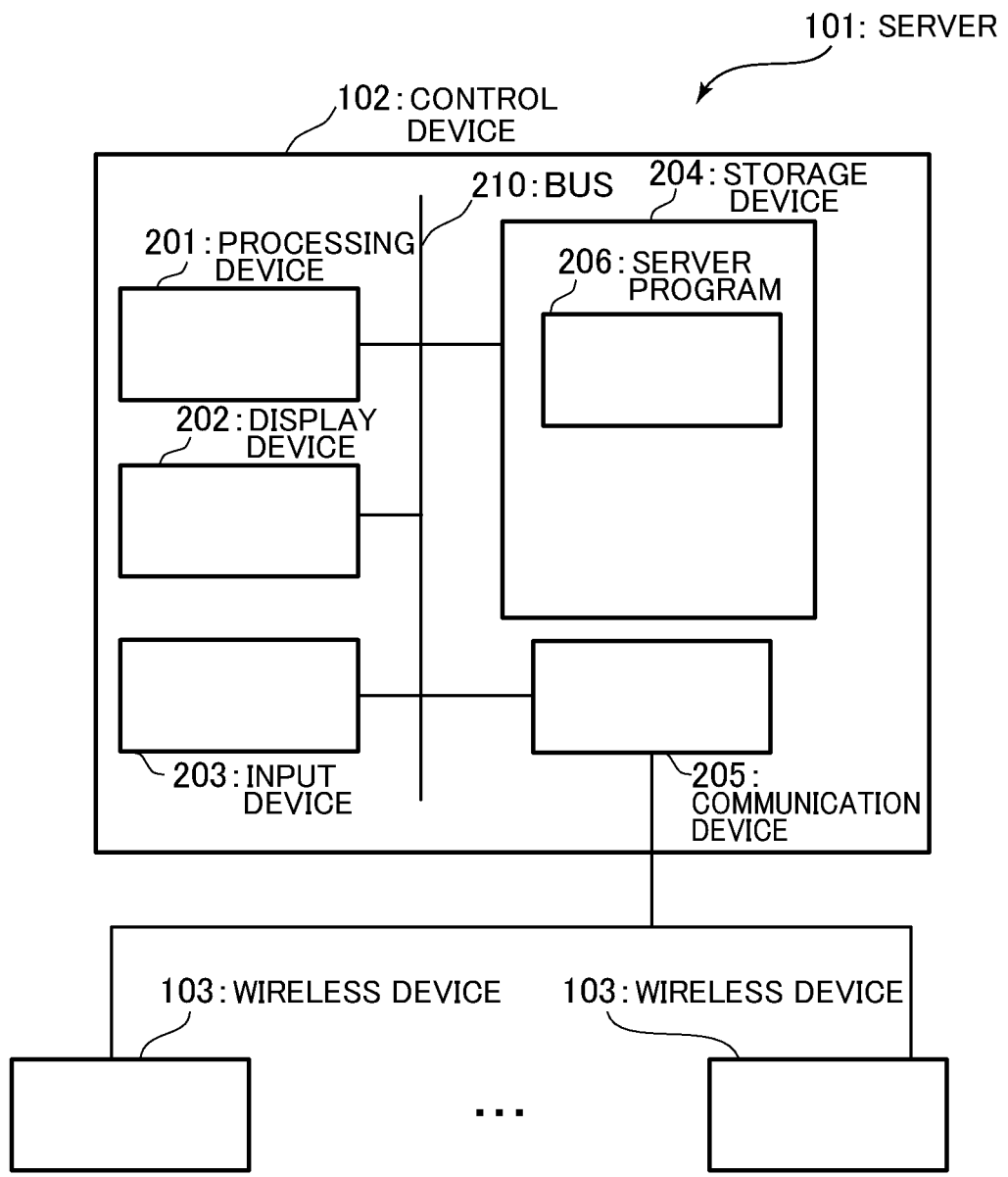
FIG. 2 is a hardware configuration diagram of a server according to the embodiment of the present invention.

The server 101 in this embodiment is a device that accepts a visit confirmation request from a user of the mobile terminal device 104 and determines whether or not the visit confirmation request is legitimate, and the server 101 includes the control device 102 and the one or more wireless devices 103, as shown in FIG. 2. The control device 102 includes a processing device 201, a display device 202, an input device 203, a storage device 204, a communication device 205, and a bus 210. The storage device 204 stores a server program 206. The communication device 205 is connected with the one or more wireless devices 103. The connection between the communication device 205 and the wireless devices 103 may take any form. For example, the connection can be made via a wired LAN or a wireless LAN. The wireless devices 103 can wirelessly connect with the mobile terminal device 104. In this embodiment, the communication method may be BLE (Bluetooth (registered trademark) Low Energy) or other methods.

The processing device 201 executes various kinds of processing on the basis of the program 206, input data from the input device 203, data received from the wireless devices 103 via the communication device 205, etc. The processing device 201 includes a processor that controls the devices included in the server 101, and executes various kinds of processing by using a register or the storage device 204 included in the processor as a work area. Although these components are connected to each other via the bus 210, the components may be connected individually as needed. The display device (display) 202 displays a management application screen, etc. in accordance with the control of the processing device 201.

The server 101 in this embodiment can be realized by, for example, a server computer connected to the Internet and a BLE server connected to the server computer via the Internet. The server computer operates as the processing device 201 and the BLE server operates as the wireless device 103. The wireless device 103 may be realized by providing the BLE server with two systems of BLE chips providing Central mode BLE and Scanning mode BLE. Furthermore, the processing device 201 of the server 101 may be realized by making the processing device of the BLE server cooperate with the processing device of the server computer.

Figure 3:
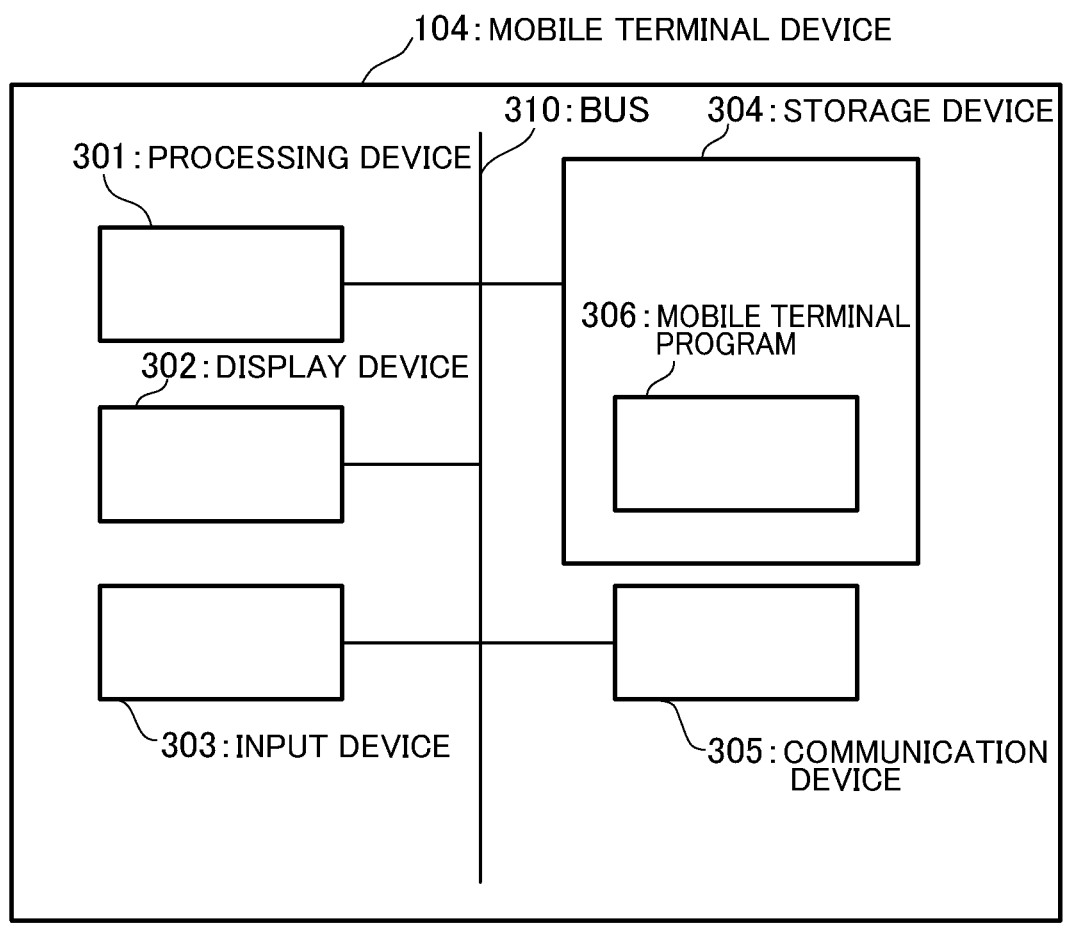
FIG. 3 a hardware configuration diagram of a mobile terminal device according to the embodiment of the present invention.

The mobile terminal device 104 in this embodiment is a device for executing a check-in in which an account for an online game, etc. is associated with a user who visited a prescribed location by transmitting a visit confirmation request to the server 101 by wireless communication. The mobile terminal device 104 may be a mobile device such as a mobile phone, a smartphone, a tablet terminal, or a portable game machine. The mobile terminal device 104 includes a processing device 301, a display device 302, an input device 303, a storage device 304, a communication device 305, and a bus 310, as shown in FIG. 3. The storage device 304 stores a mobile terminal program 306.

The processing device 301 executes various kinds of processing such as image processing or execution of an application such as a visit confirmation application or a web browser, on the basis of the program 306, input data from the input device 303, data received from the communication device 305, etc. The processing device 301 includes a processor that controls the devices included in the mobile terminal device 104, and executes various kinds of processing by using a register or the storage device 304 included in the processor as a work area. Although these components are connected to each other via the bus 310, the components may be connected individually as needed.

The storage devices 204 and 304 include a hard disk, a main memory, and a buffer memory. Alternatively, however, any kind of non-volatile storage or non-volatile memory that can store information, which may be removable, may be used in place of the hard disk. The storage devices 204 and 304 store the programs 206 and 306 and various kinds of data that can be referred to when the programs are executed.

Figure 4:
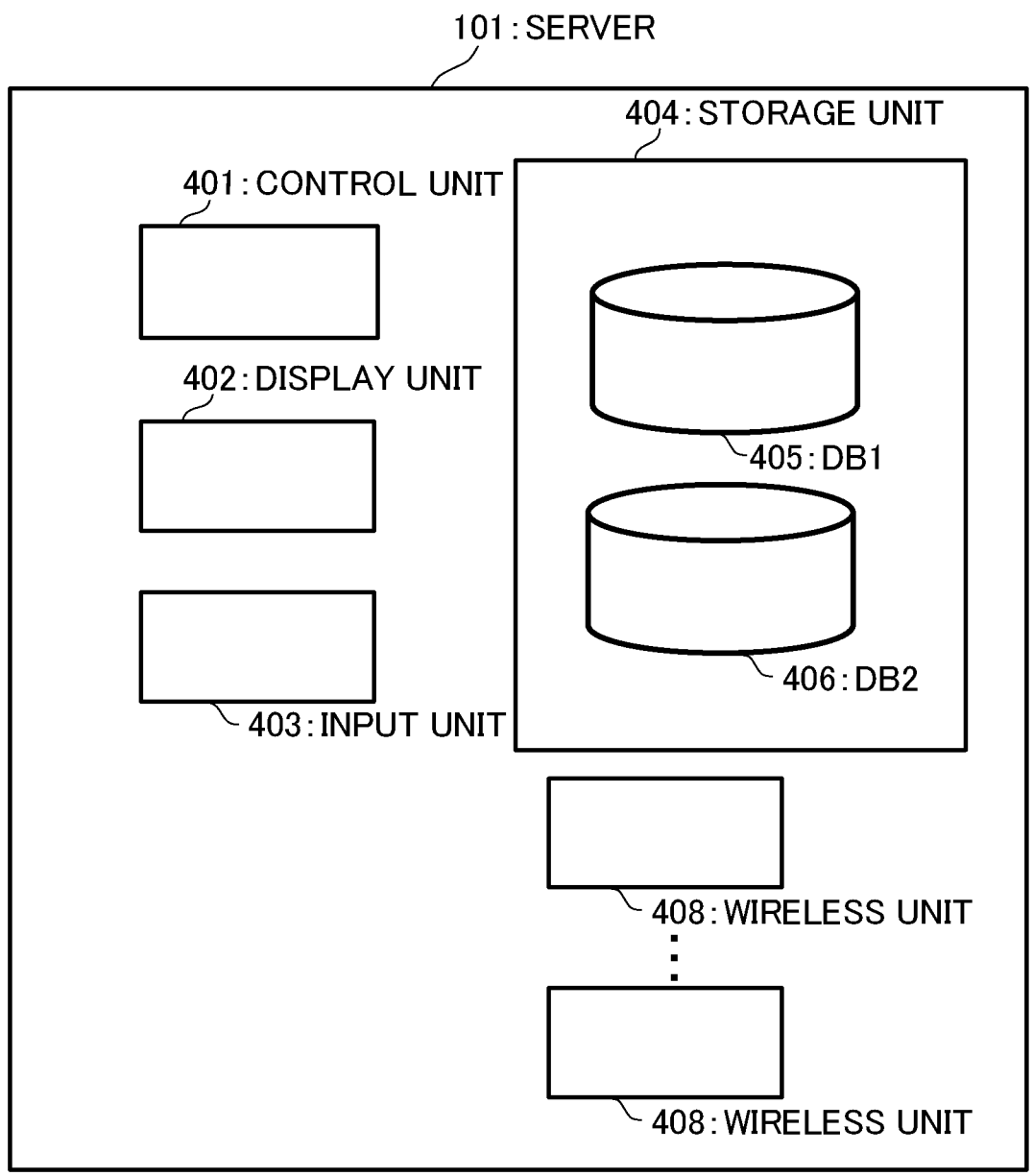
FIG. 4 is a functional block diagram of the server according to the embodiment of the present invention.

FIG. 4 shows an example of a functional block diagram of the server 101 according to the present invention. The server 101 includes a server control unit 401, a server display unit 402, a server input unit 403, a server storage unit 404, and one or more wireless units 408.

The server display unit 402 displays information to be provided to a user of the server. The server input unit 403 accepts an input from the user. The server storage unit 404 stores information required for information processing executed by the server control unit 401. The server control unit 401 includes DB1 (405) and DB2 (406). DB1 stores, in association with a token and a task, a user identifier for identifying a user of the mobile terminal device 104 who transmitted a visit confirmation request. The token is an identifier temporarily assigned to the user ID to determine whether the visit confirmation request is legitimate, and the task is assigned to the mobile terminal device 104 to confirm the legitimacy of the visit confirmation request. The control unit 401 transmits a service notification for notifying that a visit confirmation service is available via the one or more wireless units 408, receives a visit confirmation request transmitted from the mobile terminal device 104 and including a user identifier, and transmits a task notification for issuing a notification about a token and a task associated with the user identifier. Upon repeatedly receiving a task completion notification from the mobile terminal device 104 that completed the task via at least one wireless unit 408, the control unit 401 transmits, from the wireless unit 408, a solution request for requesting a solution that is an output of the task, receives a solution notification transmitted from the mobile terminal device 104, and determines the legitimacy of the visit confirmation request on the basis of the solution notification.

In this embodiment, the server control unit 401 is realized by the server program 206, included in the hardware configuration shown in FIG. 2, being executed by the processing device 201, but can also be realized by providing an integrated circuit, etc. Furthermore, the server display unit 402, the server input unit 403, the server storage unit 404, and the wireless unit 408 are respectively realized by each piece of hardware in the display device 202, the input device 203, the storage device 204, and the wireless device 103, shown in FIG. 2, but may be realized by the server program 206 being executed by the processing device 201, etc. and cooperating with each piece of hardware.

Figure 5:
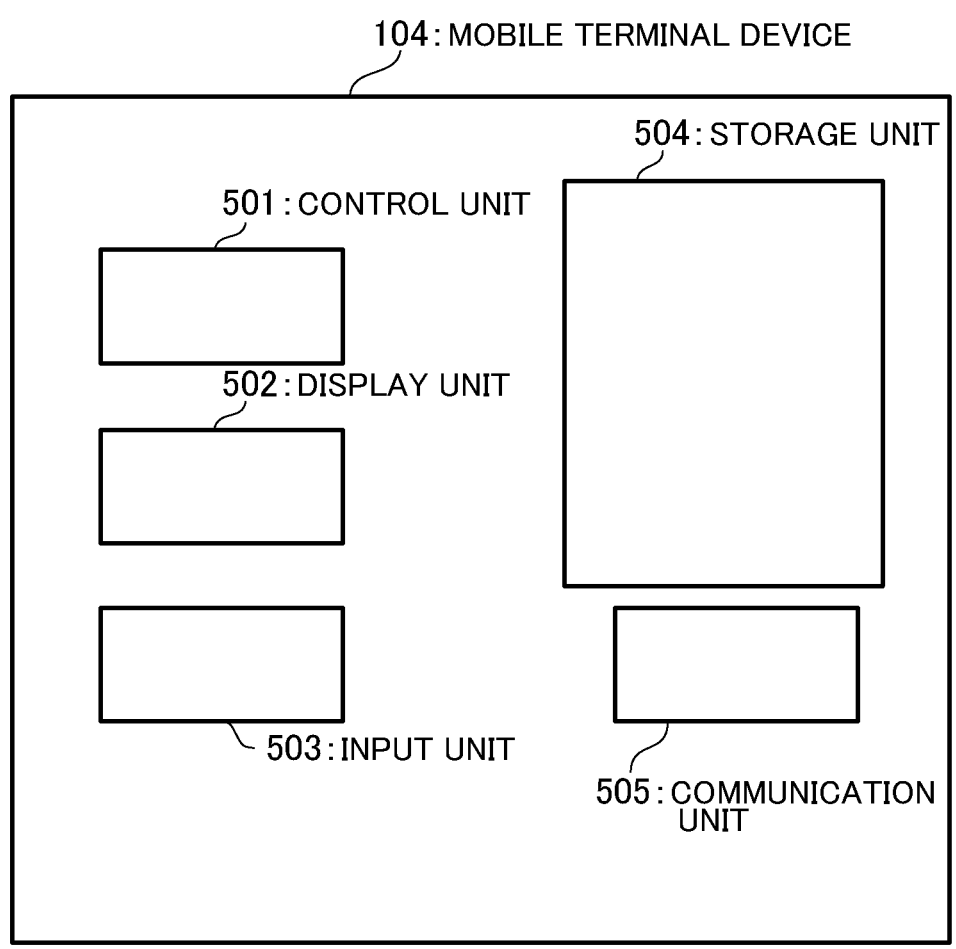
FIG. 5 is a functional block diagram of the mobile terminal device according to the embodiment of the present invention.

FIG. 5 shows an example of a functional block diagram of the mobile terminal device 104 according to the present invention. The mobile terminal device 104 includes a mobile terminal control unit 501, a mobile terminal display unit 502, a mobile terminal input unit 503, a mobile terminal storage unit 504, and a mobile terminal communication unit 505. The mobile terminal display unit 502 displays information to be provided to a user. The mobile terminal input unit 503 accepts an input from the user. The mobile terminal storage unit 504 stores information required for information processing executed by the mobile terminal control unit 501.

The mobile terminal control unit 501 receives a service notification, transmitted from the server 101, for notifying that a visit confirmation service is available via the mobile terminal communication unit 505, transmits a visit confirmation request including a user identifier for identifying a user of the mobile terminal device 104, and receives a task notification, including a token, transmitted from the server 101 in response to the visit confirmation request. Furthermore, the control unit 501 executes a task on the basis of the received task notification, and when the task completes, repeatedly transmits a task completion notification including a token via the communication unit 505. Then, upon receiving, from the server 101, a solution request for requesting a solution that is an output of the task via the communication unit 505, the control unit 501 transmits a solution notification including the solution of the task.

In this embodiment, the mobile terminal control unit 501 is realized by the mobile terminal program 306, included in the hardware configuration shown in FIG. 3, being executed by the processing device 301, but can also be realized by providing an integrated circuit, etc. Furthermore, the mobile terminal display unit 502, the mobile terminal input unit 503, the mobile terminal storage unit 504, and the mobile terminal communication unit 505 are respectively realized by each piece of hardware of the display device 302, the input device 303, the storage device 304, and the communication device 305, shown in FIG. 3, but may be realized by the program 306 being executed by the processing device 301, etc. and cooperating with each piece of hardware.

Figure 6:
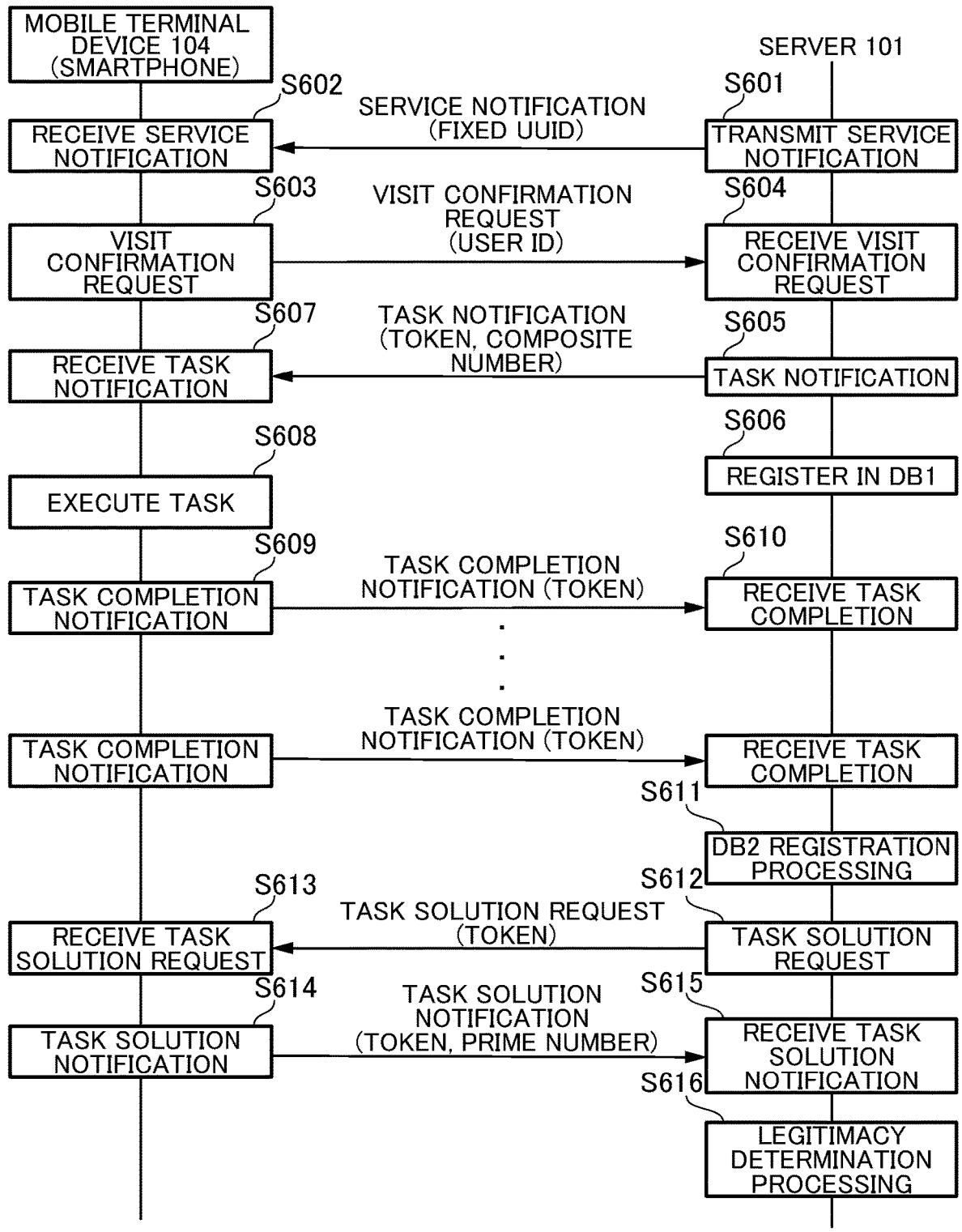
FIG. 6 is a flowchart showing information processing according to the embodiment of the present invention.

Next, FIG. 6 shows a flowchart of the operation of the server 101 and the mobile terminal device 104 in this embodiment. In this embodiment, the case where it is determined that a user of a smartphone that is the mobile terminal device 104 visited a prescribed location and a bonus such as an item in an online game is provided is described as an example. In this embodiment, a "check-in" in which a user whose visit confirmation was determined to be legitimate, i.e., a user authenticated as having actually visited a prescribed location, is associated with an online game account, and a bonus is provided to the checked-in account.

The prescribed location is not limited to a small space and can be, for example, a large event site in which an event relating to an online game is being held. When a user actually visits the event site and is authenticated by executing a visit confirmation request using a visit confirmation application, the user is considered as having actually visited the location, and a bonus is distributed to the game account of the user.

In this embodiment, the wireless device 103 of the server 101 is installed in a site serving as the prescribed location. Here, the wireless unit 408 is realized by using a wireless device of a BLE server as the wireless device 103. BLE servers are installed at intervals of, for example, several meters to cover the whole site. The BLE server is equipped with two systems of BLE chips providing Peripheral mode (Advertising mode) BLE and Central mode (Scanning mode) BLE, is connected to the control device 102 via a wired or wireless LAN, and realizes the server 101 as a whole. In this embodiment, a plurality of wireless devices 103 are installed assuming a large event site, but a single wireless device 103 may be installed in a sufficiently small event site, and even in a large event site, the present invention can be realized by requiring a visit to be within a range that can be covered with the single wireless device.

When the system in this embodiment is started, first, the wireless unit 408 of the server 101 continuously executes a service advertisement (transmission of a service notification) for notifying that a visit confirmation service is available (S601). In this embodiment, a BLE server realizing the wireless unit 408 starts in the Peripheral mode and advertises the service by using a fixed UUID. Because the UUID indicates that the visit confirmation service is available, a common UUID is used in all BLE servers to execute the service advertisement. A BLE advertising packet is broadcasted every 20 ms.

When a user downloads a visit confirmation application as the mobile terminal program 306, installs the visit confirmation application on the mobile terminal device 104, visits a site, and starts the visit confirmation application, the mobile terminal device 104 receives the service advertisement (S602). It is also possible to access a visit confirmation web page without downloading the visit confirmation application, to display the web page on the mobile terminal device 104, and to execute BLE communication via the web page. The mobile terminal device 104 determines, by using the reception of the service advertisement, that the mobile terminal device 104 is within an area in which the visit confirmation service is available, and starts visit confirmation request processing to be checked-in. At this time, the processing may be started automatically upon receiving the service advertisement, or may be started after indicating that the visit confirmation service is available to the user via the display unit 502 and accepting a start instruction of the user from the input unit 503. The mobile terminal device 104 transmits a visit confirmation request including a user ID to the server 101 (S603). The user ID is an identifier specific to the user of the mobile terminal device 104.

In this embodiment, the mobile terminal device 104 has a BLE communication function, and starts BLE in the Central mode first. Then, upon finding the service by receiving the service advertisement advertised by the wireless unit 408 by using the fixed UUID, the mobile terminal device 104 executes general BLE connection processing and establishes a connection with the server 101 via the wireless unit 408 in order to start the visit confirmation request processing. Then, the mobile terminal device 104 transmits a visit confirmation request including a user ID to the wireless unit 408. When a certain number of connections or more are established, the transmission of the service advertising packet may be stopped in order to limit the number of simultaneous connections accepted by the wireless unit 408.

When the wireless unit 408 of the server 101 receives the visit confirmation request (S604), the control unit 401 of the server 101 generates a token and a task, transmits, via the wireless unit 408, the token and task information by including them in a task notification, and ends the connection (S605). The task information indicates a task to be executed by the mobile terminal device 104. By disconnecting the connection before executing the task, even in the case where a large number of visit confirmation requests occur at the same time, a specific mobile terminal device does not continuously occupy a wireless resource (BLE connection) any more, and thus, automatic and compulsive load balancing is realized.

The token is a temporary ID for identifying a user who transmitted a visit confirmation request, and is associated with a user ID. In this embodiment, the token is transmitted as a UUID in a task notification. The task in this embodiment is to execute prime factorization of a provided composite number and transmit an obtained set of prime numbers as a solution. Here, the task information is a composite number subjected to the prime factorization. The composite number is a positive integer that can be represented as the product of two or more prime numbers. Upon receiving the visit confirmation request, the server 101 generates a composite number subjected to prime factorization, which is the task, and transmits, via the wireless unit 408, the generated composite number to the mobile terminal device 104 by including the composite number in a task notification as task information.

The task is not limited to prime factorization and may be any kind of task that uses many resources of the mobile terminal device to generate a solution and that requires at least a certain amount of time. For example, instead of prime factorization, the task can be a problem of reverse-generating an original value from a hash value generated by using eigenvalue decomposition or a cryptographic hash function, or can be selectively provided from among a plurality of kinds of tasks or provided as a combination of these kinds of tasks. In the case where the task is prime factorization, a composite number can be easily generated by selecting two or more prime numbers from a list of prime numbers stored in the storage unit and multiplying the selected prime numbers. Furthermore, because the prime factorization takes longer as the prime number becomes larger, the composite number can be determined on the basis of a time to be spent by the mobile terminal device. The problem of reverse-generating an original value from a hash value generated by using a cryptographic hash function is, for example, a task of restoring an original string ("The quick brown fox jumps over the lazy dog") from a hash value (e.g., "2fd4e1c6 7a2d28fc ed849ee1 bb76e739 1b93eb12") calculated by inputting a string (e.g., "The quick brown fox jumps over the lazy dog") in the hash function SHA1.

The control unit 401 stores a user ID in the database DB1 (405) in association with a token and a task (S606). A data structure P of data stored in DB1 in this embodiment is as follows.

[Eq. 1]

$$P:=\{UserID, UUID, Task, Timestamp, Valid\_Until\} \quad (1)$$

UserID is a user ID, UUID is a token associated with the user ID, Task is a task to be executed by the mobile terminal device 104 and is a composite number in this embodiment. Timestamp is a timestamp indicating a time at which the association between the user ID and the UUID (token) was executed, and Valid_Until indicates a valid period of the association. This valid period can be used as a valid period of the token or a valid period of the visit confirmation request. DB1 stores the user ID and the UUID in association with each other every time the server 101 executes new token association. Furthermore, when it becomes unnecessary to retain data, such as when the legitimacy determination processing of the visit confirmation request ends or when the valid period of the association expires, the association is released, i.e., the data is deleted.

Upon receiving the task notification (S607), the mobile terminal device 104 executes the task on the basis of the task information included in the task notification (S608). In this embodiment, the task of executing the prime factorization of the composite number provided as the task information is executed. Because there is no high-speed solution for prime factorization of a large integer and it is required to continuously attempt to check whether the composite number is divisible by each prime number, the mobile terminal device 104 is forced to wait before proceeding to the next processing.

This makes it possible to prevent an illegitimate act of executing visit confirmation processing for a plurality of accounts simultaneously in parallel by using one mobile terminal device 104. In this embodiment, the mobile terminal device 104 executes prime factorization by storing a list of prime numbers in the storage unit 504 and dividing the composite number by the prime numbers read one by one from the list.

When the mobile terminal device 104 completes the prime factorization, the mobile terminal device 104 switches to the Peripheral mode, and repeatedly transmits a task completion notification by means of an advertising packet including, as a UUID, a token included in the task notification (S609). A BLE advertising packet is broadcasted every 20 ms. By broadcasting the task completion notification to be transmitted, it becomes possible for the task completion notification to be received by unspecified wireless units 408. It is assumed that the user moves in the site while causing the mobile terminal device 104 to execute check-in processing. Thus, when transmitting the task completion notification, there is the case where the user has left the coverage of a wireless unit 408 that transmitted the service advertisement received by the mobile terminal device 104, and has moved into the coverage of another wireless unit 408. If the task completion notification is broadcasted, the task completion notification may be received by any of the wireless units 408, and thus, it becomes possible to provide a highly convenient system in which users are allowed to move.

At least one of the plurality of wireless units 408 of the server 101 repeatedly receives the task completion notification (S610). The control unit 401 identifies, by referring to DB1, a user ID associated with the token included in the task completion notification, and stores the token, the reception time of the token, and an ID of the wireless unit 408 (BLE server) that received the token in DB2 as task completion notification history information in association with the identified user ID (S611). The data structure of task completion notification history information R stored in DB2 in this embodiment is as follows.

[Eq. 2]

$$R:=\{UserID, UUID, Timestamp, BLE\_Server\} \quad (2)$$

Here, UserID is a user ID of a user who executed a visit confirmation request, UUID is a token associated with the user ID, Timestamp is a timestamp indicating a time at which an advertising packet serving as a completion notification was received, and BLE_Server is an ID of a BLE server that realizes a wireless unit 408 that received the advertising packet.

When the task completion notification is repeatedly received for a certain period of time, the server 101 transmits a solution request for requesting a solution that is an output of the task (S612). In this embodiment, the task completion notification is advertised for five minutes at 20 ms intervals. By causing the mobile terminal device 104 to repeatedly transmit the task completion notification for a certain period of time, it is possible to cause the wireless resources of the mobile terminal device 104 to be consumed and prevent a plurality of kinds of check-in processing from being executed simultaneously in parallel.

Regarding the reception of the task completion notification, it is also possible to consider a prescribed number of receptions instead of reception for a certain period of time. Furthermore, the task completion notification for which the reception time or the number of receptions is considered may be limited to a task completion notification received by one wireless unit 408, or may include task completion notifications received by all of the wireless units 408. In the case where the task completion notifications received by all of the wireless units 408 are considered, for example, it is preferable to consider the receptions of the task completion notifications transmitted at the same time from the mobile terminal device 104 as one reception on the basis of the reception times. In order to allow the user to move during the transmission of a task completion notification, an embodiment in which task completion notifications received by a plurality of wireless units 408 is considered is preferred.

Upon receiving the task solution request (S613), the mobile terminal device 104 transmits a solution obtained by executing the task, i.e., prime numbers obtained by the prime factorization in this embodiment, by including the solution in a task solution notification (S614). The solution to be transmitted by being included in the solution notification may be any information that can indicate that the task has been executed.

In this embodiment, the wireless unit 408 of the server 101 can operate in the Peripheral mode and always starts in the Central mode. When the server 101 finds, via the wireless unit 408, a service advertised by the mobile terminal device 104, the server 101 receives an advertising packet serving as a task completion notification for a certain period of time (S610). After the certain period of time passes, in the case where the mobile terminal device 104 is continuing the advertisement, the server 101 connects to the mobile terminal device 104 as a normal BLE connection and transmits a task solution request (S612). The task solution request may be transmitted after it is confirmed that the transmission has been repeatedly executed a certain number of times, not after the certain period of time passes. Upon accepting the connection and receiving the task solution request (S613), the mobile terminal device 104 in the Peripheral mode transmits a task solution notification including a calculated prime factorization result to the server 101 via the wireless unit 408 with which the mobile terminal device 104 is connected (S614). The task solution notification is transmitted by using a token as a UUID.

Upon receiving the task solution notification (S615), the server 101 executes legitimacy determination processing for the visit confirmation request (S616).

FIG. 7 shows a flowchart of the legitimacy determination processing in this embodiment. The control unit 401 of the server 101 first verifies the mathematical legitimacy of the solution included in the task solution notification (S701). On the basis of the token included in the received task solution notification, a user ID and a composite number associated with the token are read from DB1, and the composite number is compared with a value obtained by multiplying prime numbers obtained as a prime factorization result included in the received task solution notification. In the case where the composite number and the value match, the solution is determined to be mathematically legitimate, and in the case where the composite number and the value do not match, the solution is determined to be mathematically illegitimate. The mathematical legitimacy may be verified by storing, in DB1, prime numbers from which a composite number was created instead of the composite number, and comparing the prime numbers stored in DB1 with the prime numbers included in the task solution notification. In the case where the solution is determined to be mathematically illegitimate, the visit confirmation request is determined to be illegitimate (S702), and the legitimacy determination processing ends.

In the case where the solution is determined to be mathematically legitimate, next, the temporal density legitimacy of the task completion notification is verified (S703). The temporal density is used to confirm that the reception of the task completion notification is executed at certain intervals. In the case where the temporal density is significantly low, there is a possibility that the mobile terminal device 104 is illegitimately executing a plurality of kinds of visit confirmation request processing simultaneously in parallel, the task completion notification is determined to be illegitimate. In the case where the server 101 receives the task completion notification with the temporal density within a prescribed range, the task completion notification is determined to have a legitimate temporal density. In the case where the task completion notification is determined not to have a legitimate temporal density, the visit confirmation request is determined to be illegitimate (S702), and the legitimacy determination processing ends.

In this embodiment, the mobile terminal device 104 broadcasts the task completion notification every 20 ms for five minutes. When the number of task completion notifications received by all of the wireless units 408 is within a prescribed range, the server 101 determines the temporal density of the task completion notifications from the mobile terminal device 104 to be legitimate. For example, in the case where the number of received task completion notifications per five minutes is 14000-15000, the temporal density is determined to be legitimate. By setting a prescribed acceptable range for the number of received task completion notifications, it is possible to accept a task completion notification that is not illegitimate but cannot be received by the server 101 due to the effects of wireless communication, etc., thereby preventing a legitimate confirmation request from being determined to be illegitimate.

In this embodiment, the control unit 401 determines the temporal density legitimacy by reading, on the basis of the token included in the solution notification, all Timestamp values of the task completion notifications associated with the token from DB2 (406). Specifically, the number of task completion notifications received within five minutes after the first task completion notification was received is counted, and in the case where the total number of task completion notifications is 14000-15000, the temporal density is determined to be legitimate.

Furthermore, the temporal density may be determined to be illegitimate when timestamp intervals are not intervals within a prescribed range. For example, it is possible to calculate the reception intervals of task completion notifications from Timestamp values of the task completion notifications, and in the case where all of the reception intervals are not intervals within a prescribed range (e.g., 15-45 ms), determines the task completion notifications to be illegitimate. This makes it possible to prevent an illegitimate act of executing a plurality of kinds of check-in processing simultaneously in parallel by means of a single mobile terminal device by transmitting a required number of task solution notifications in a short time in a burst manner.

In the case where the temporal density is determined to be legitimate, spatial density legitimacy determination is further executed (S704). The spatial density indicates the number of task completion notifications received by one wireless unit 408 within a certain unit time. In the case where the spatial density is excessive compared with the size of the coverage of one wireless unit or the number of visitors to an event site, it is determined that there is a possibility that an illegitimate act of bringing a large number of devices to attempt check-ins is being executed by one person.

In this embodiment, the control unit 401 refers to DB2 (406), determines whether or not the number of task completion notifications associated with all tokens and received within a prescribed time by the wireless unit 408 that received the task completion notification is less than or equal to a spatial density upper limit value, by determining that the spatial density is legitimate in the case where the number of task completion notifications is less than or equal to the upper limit value and determining that the spatial density is illegitimate in the case where the number of task completion notifications exceeds the upper limit value (S702), and the legitimacy determination processing ends. Although the mathematical density legitimacy is verified for a task completion notification associated with one UUID, the spatial density legitimacy is verified for task completion notifications associated with all UUIDs including other UUIDs.

For example, in this embodiment, because wireless devices are arranged at intervals of several meters, it is considered that the number of users who can be present in the coverage (several meters radius) of one wireless unit 408 does not exceed 20. Thus, it is possible to set the spatial density upper limit value for the number of received task completion notifications to 500×20 users=10000/second. It is possible to determine the spatial density legitimacy on the basis of not only the number of task completion notifications but also, for example, the number of received visit confirmation requests or task solution notifications. In this embodiment, the task completion notification received by the wireless unit 408 is obtained by sorting task completion notifications stored in DB2 by the identifier of the wireless unit 408 (BLE_Server).

In the case where the spatial density is determined to be legitimate (S704), the visit confirmation request is determined to be legitimate (S705), the legitimacy determination processing ends, and the visit confirmation request processing also ends.

Furthermore, in this embodiment, in the case where the visit confirmation request is determined to be legitimate, the server 101 executes an association between an online game account and the user who visited the site (check-in), and executes processing for providing the online game account with a bonus such as a virtual item that can be used in the online game. It is also possible to transmit information for notifying that the check-in has successfully completed to the mobile terminal device 104. Meanwhile, when the visit confirmation request is determined to be illegitimate, the visit confirmation request processing for the mobile terminal device 104 returns to S605, a new token and composite number are assigned and transmitted, and the execution of the task is repeatedly requested until it is confirmed that the visit confirmation request is not illegitimate. In another embodiment, in the case where the visit confirmation request is determined to be illegitimate, it is possible to transmit a notification for displaying that fact to the mobile terminal device 104, end the visit confirmation request processing once, and restart the visit confirmation request processing from the start.

In this embodiment, the load on the server side can be decreased, and the CPU time and Bluetooth band on the mobile terminal device side are significantly consumed for one execution of visit confirmation request processing. Thus, even if a tampered program is used, it is possible to limit the number of check-ins that can be executed by a single device by being authenticated within a visit confirmation request valid period to once or so. Therefore, in order to execute an illegitimate act, it is required to prepare the same number of Bluetooth devices as the number of accounts at a site, or continue to stay at the site for a time multiplied by the number of accounts for which the illegitimate act is executed, and thus, it is not possible to execute a large-scale illegitimate act.

What has been described in this embodiment is an embodiment in which a visit confirmation request is determined to be legitimate in the case where the visit confirmation request is determined to be legitimate with respect to all of mathematical legitimacy, temporal density legitimacy, and spatial density legitimacy. By determining the temporal density legitimacy to confirm that a plurality of kinds of visit confirmation request processing are not being executed in parallel by a mobile terminal device, and by determining the spatial density legitimacy to confirm the total number of mobile terminal devices, it is possible to confirm that a single user is not bringing a large number of devices, and that the mobile terminal device of the user is surely present at a site and the mobile terminal device is a mobile terminal device that uses a legitimate application behaving legitimately.

As another embodiment, it is possible to implement an embodiment in which S704 is omitted and only the mathematical legitimacy and the temporal density legitimacy are determined. It is possible to prevent a single BLE device to execute remote check-ins of a plurality of users by using a sniffering tool that observes a BLE packet and relays the BLE packet to another network. Furthermore, as yet another embodiment, it is possible to implement an embodiment in which S703 is omitted and only the mathematical legitimacy and the spatial legitimacy are determined. In this case, it is possible to prevent illegitimate check-ins executed by bringing a large number of compact devices.

In this embodiment, the wireless unit 408 is realized by a wireless device included in a BLE server. The BLE server may realize not only the function of the wireless unit 408 but also the function of the control unit 201, for example, a task notification generation function, processing for storing information in DB1 and DB2, a task solution request function, etc. By causing each BLE server to execute processing that can be executed by each BLE server, loads can be distributed.

In the processing or operation described above, it is possible to freely modify the processing or operation as long as no inconsistency arises. Furthermore, the embodiments described above are examples for explaining the present invention, and the present invention is not limited to the embodiments. The present invention can be embodied in various forms not departing from the spirit thereof. Furthermore, the effects described in this embodiment are merely listed as the most preferable effects arising from the present invention, and the effects of the present invention are not limited to those described in this embodiment.

REFERENCE SIGNS LIST

100 Visit confirmation system
101 Server
102 Control device
104 Mobile terminal device
201 Processing device
202 Display device
203 Input device
204 Storage device
205 Communication device
206 Server program
210 Bus
301 Processing device
302 Display device
303 Input device
304 Storage device
305 Communication device
306 Mobile terminal program
310 Bus
401 Server control unit
402 Server display unit
403 Server input unit
404 Server storage unit
405 DB1
406 DB2
408 Wireless unit
501 Mobile terminal control unit
502 Mobile terminal display unit
503 Mobile terminal input unit
504 Mobile terminal storage unit
505 Mobile terminal communication unit

The invention claimed is:

1. A system used to confirm that a user of a mobile terminal device has visited a prescribed location, the system comprising the mobile terminal device and a server, the server including a control device and one or more wireless devices, wherein:
   the one or more wireless devices transmit a service notification notifying that a visit confirmation service is available;
   upon receiving the service notification, the mobile terminal device transmits a visit confirmation request including a user identifier identifying the user of the mobile terminal device;
   at least one wireless device of the one or more wireless devices receives the visit confirmation request and transmits a task notification issuing a notification about a token and a task associated with the user identifier;
   the mobile terminal device executes the task on the basis of the task notification;
   upon completing the task, the mobile terminal device repeatedly transmits a task completion notification including the token;
   upon confirming that the task completion notification has repeatedly been transmitted, at least one wireless device of the one or more wireless devices transmits a solution request requesting a solution that is an output of the task;
   upon receiving the solution request, the mobile terminal device transmits a solution notification including the solution of the task;

at least one wireless device of the one or more wireless devices receives the solution notification transmitted from the mobile terminal device; and the control device determines the legitimacy of the visit confirmation request on the basis of the solution notification.

2. The system according to claim 1, wherein the determination of the legitimacy of the visit confirmation request is executed also on the basis of whether or not the number of task completion notifications including the token associated with the user identifier and received by the one or more wireless devices within a prescribed time for determining temporal density legitimacy is within a prescribed range.

3. The system according to claim 1, wherein the determination of the legitimacy of the visit confirmation request is executed also on the basis of whether or not the number of task completion notifications received within a prescribed period for determining spatial density legitimacy by a wireless device, among the one or more wireless devices, that received the task completion notification including the token associated with the user identifier exceeds a spatial density upper limit value.

4. The system according to claim 1, wherein the task is prime factorization of a composite number associated with the token, and the solution notification includes a prime number obtained by executing the prime factorization of the composite number.

5. A server used to confirm that a user of a mobile terminal device has visited a prescribed location, the server comprising a control device and one or more wireless devices, wherein:

the one or more wireless devices transmit a service notification notifying that a visit confirmation service is available;

at least one wireless device of the one or more wireless devices receives a visit confirmation request including a user identifier transmitted from the mobile terminal device and transmits a task notification issuing a notification about a token and a task associated with the user identifier;

upon confirming that a task completion notification has repeatedly been transmitted from the mobile terminal device, at least one wireless device of the one or more wireless devices transmits a solution request requesting a solution that is an output of the task;

at least one wireless device of the one or more wireless devices receives a solution notification transmitted from the mobile terminal device; and the control device determines the legitimacy of the visit confirmation request on the basis of the solution notification.

6. A mobile terminal device used to confirm that a user of the mobile terminal device has visited a prescribed location, wherein the mobile terminal device:

upon receiving a service notification transmitted from one or more wireless devices, transmits a visit confirmation request including a user identifier identifying the user of the mobile terminal device;

executes a task on the basis of a task notification received from at least one wireless device of the one or more wireless devices and notifying a token and the task associated with the user identifier;

upon completing the task, repeatedly transmits a task completion notification including the token; and when the mobile terminal device receives a solution request from at least one wireless device of the one or more wireless devices, transmits a solution notification including a solution of the task.

7. A non-transitory, computer readable medium storing a set of programs for a system used to confirm that a user of a mobile terminal device has visited a prescribed location, the system comprising the mobile terminal device and a server, the server including a control device and one or more wireless devices, the set of programs causing the execution of:

a step in which the one or more wireless devices transmit a service notification notifying that a visit confirmation service is available;

a step in which, upon receiving the service notification, the mobile terminal device transmits a visit confirmation request including a user identifier identifying the user of the mobile terminal device;

a step in which at least one wireless device of the one or more wireless devices receives the visit confirmation request and transmits a task notification issuing a notification about a token and a task associated with the user identifier;

a step in which the mobile terminal device executes the task on the basis of the task notification;

a step in which, upon completing the task, the mobile terminal device repeatedly transmits a task completion notification including the token;

a step in which, upon confirming that the task completion notification has repeatedly been transmitted, at least one wireless device of the one or more wireless devices transmits a solution request requesting a solution that is an output of the task;

a step in which, upon receiving the solution request, the mobile terminal device transmits a solution notification including the solution of the task;

a step in which at least one wireless device of the one or more wireless devices receives the solution notification transmitted from the mobile terminal device; and a step in which the control device determines the legitimacy of the visit confirmation request on the basis of the solution notification.

8. A non-transitory, computer readable medium storing a program used to confirm that a user of a mobile terminal device has visited a prescribed location, the program causing a server comprising a control device and one or more wireless devices to execute:

a step of transmitting a service notification notifying that a visit confirmation service is available;

a step of receiving a visit confirmation request including a user identifier transmitted from the mobile terminal device and transmitting a task notification issuing a notification about a token and a task associated with the user identifier;

a step in which at least one wireless device of the one or more wireless devices transmits a solution request requesting a solution that is an output of the task;

a step in which, upon confirming that a task completion notification has repeatedly been transmitted from the mobile terminal device, at least one wireless device of the one or more wireless devices receives a solution notification transmitted from the mobile terminal device; and a step in which the control device determines the legitimacy of the visit confirmation request on the basis of the solution notification.

9. A non-transitory, computer readable medium storing a program used to confirm that a user of a mobile terminal device has visited a prescribed location, the program causing the mobile terminal device to execute:
- a step in which, upon receiving a service notification transmitted from one or more wireless devices, a visit confirmation request including a user identifier identifying the user of the mobile terminal device is transmitted;
- a step in which a task is executed on the basis of a task notification received from at least one wireless device of the one or more wireless devices and notifying a token and the task associated with the user identifier;
- a step in which, upon completing the task, a task completion notification including the token is repeatedly transmitted; and
- a step in which, when the mobile terminal device receives a solution request from at least one wireless device of the one or more wireless devices, a solution notification including a solution of the task is transmitted.

10. A method executed by a system used to confirm that a user of a mobile terminal device has visited a prescribed location, the system including the mobile terminal device and a server, the server including a control device and one or more wireless devices, the method comprising:
- a step in which the one or more wireless devices transmit a service notification notifying that a visit confirmation service is available;
- a step in which, upon receiving the service notification, the mobile terminal device transmits a visit confirmation request including a user identifier identifying the user of the mobile terminal device;
- a step in which at least one wireless device of the one or more wireless devices receives the visit confirmation request and transmits a task notification issuing a notification about a token and a task associated with the user identifier;
- a step in which the mobile terminal device executes the task on the basis of the task notification;
- a step in which, upon completing the task, the mobile terminal device repeatedly transmits a task completion notification including the token;
- a step in which, upon confirming that the task completion notification has repeatedly been transmitted, at least one wireless device of the one or more wireless devices transmits a solution request requesting a solution that is an output of the task;
- a step in which, upon receiving the solution request, the mobile terminal device transmits a solution notification including the solution of the task;
- a step in which at least one wireless device of the one or more wireless devices receives the solution notification transmitted from the mobile terminal device; and
- a step in which the control device determines the legitimacy of the visit confirmation request on the basis of the solution notification.

11. A method used to confirm that a user of a mobile terminal device has visited a prescribed location, the method executed by a server including a control device and one or more wireless devices, the method comprising:
- a step of transmitting a service notification notifying that a visit confirmation service is available;
- a step of receiving a visit confirmation request including a user identifier transmitted from the mobile terminal device and transmitting a task notification issuing a notification about a token and a task associated with the user identifier;
- a step in which, upon confirming that a task completion notification has repeatedly been transmitted from the mobile terminal device, at least one wireless device of the one or more wireless devices transmits a solution request requesting a solution that is an output of the task;
- a step in which at least one wireless device of the one or more wireless devices receives a solution notification transmitted from the mobile terminal device; and
- a step in which the control device determines the legitimacy of the visit confirmation request on the basis of the solution notification.

12. A method used to confirm that a user of a mobile terminal device has visited a prescribed location, the method executed by the mobile terminal device, the method comprising:
- a step in which, upon receiving a service notification transmitted from one or more wireless devices included in a server, a visit confirmation request including a user identifier identifying the user of the mobile terminal device is transmitted;
- a step in which a task is executed on the basis of a task notification received from at least one wireless device of the one or more wireless devices and notifying a token and the task associated with the user identifier;
- a step in which, upon completing the task, a task completion notification including the token is repeatedly transmitted; and
- a step in which, when the mobile terminal device receives a solution request from at least one wireless device of the one or more wireless devices, a solution notification including a solution of the task is transmitted.

* * * * *